(12) United States Patent
Schneider et al.

(10) Patent No.: US 11,857,947 B2
(45) Date of Patent: Jan. 2, 2024

(54) USE OF AN ABSORBER MATERIAL FOR ABSORBING AND / OR DISTRIBUTING LIQUIDS IN AN ACTIVELY AND / OR PASSIVELY COOLED CURRENT-CARRYING SYSTEM

(71) Applicant: Carl Freudenberg KG, Weinheim (DE)

(72) Inventors: Ulrich Schneider, Darmstadt (DE); Markus Weber, Weinheim (DE); Sarah Senne, Heddesheim (DE)

(73) Assignee: CARL FREUDENBERG KG, Weinheim (DE)

( * ) Notice: Subject to any disclaimer, the term of this patent is extended or adjusted under 35 U.S.C. 154(b) by 182 days.

(21) Appl. No.: 17/381,255

(22) Filed: Jul. 21, 2021

(65) Prior Publication Data
US 2022/0023833 A1 Jan. 27, 2022

(30) Foreign Application Priority Data

Jul. 27, 2020 (DE) ...................... 10 2020 119 727.6

(51) Int. Cl.
*B01J 20/28* (2006.01)
*H01M 10/613* (2014.01)
*H01M 10/6567* (2014.01)
*B01J 20/26* (2006.01)
*F25B 17/02* (2006.01)

(52) U.S. Cl.
CPC ......... *B01J 20/2805* (2013.01); *B01J 20/261* (2013.01); *F25B 17/02* (2013.01); *H01M 10/613* (2015.04); *H01M 10/6567* (2015.04)

(58) Field of Classification Search
CPC ...... B01J 20/2805; B01J 20/261; F25B 17/02; H01M 10/613; H01M 10/6567
See application file for complete search history.

(56) References Cited

U.S. PATENT DOCUMENTS

| 5,298,284 | A | 3/1994 | Buckwald |
| 6,308,728 | B1 * | 10/2001 | Frazier ................... G01M 3/04 211/184 |
| 9,356,329 | B2 * | 5/2016 | Dämon ............... H01M 50/209 |
| 9,972,872 | B2 * | 5/2018 | Dämon ............. H01M 10/6567 |

(Continued)

FOREIGN PATENT DOCUMENTS

| CN | 1349789 A | 5/2002 |
| DE | 4134370 C1 | 1/1993 |

(Continued)

*Primary Examiner* — Tho V Duong
*Assistant Examiner* — Raheena R Malik
(74) *Attorney, Agent, or Firm* — LEYDIG, VOIT & MAYER, LTD.

(57) ABSTRACT

A method includes: providing an absorber material including: a casing; and superabsorbent particles arranged therein, and using the absorber material to absorb and/or distribute liquids in an actively and/or passively cooled current-carrying system including an actively and/or passively cooled power storage system. The casing has at least two plies arranged in a planar fashion on one another. Regions of the at least two plies are connected to one another by at least one seam such that the casing is segmented in a form of pockets separated from one another. At least some of the pockets have the superabsorbent particles.

20 Claims, 10 Drawing Sheets

(56) References Cited

U.S. PATENT DOCUMENTS

| | | | |
|---|---|---|---|
| 10,122,054 B2* | 11/2018 | Shen | H01M 10/659 |
| 2011/0008666 A1 | 1/2011 | Yoon et al. | |
| 2013/0022845 A1* | 1/2013 | Davis | H01M 50/579 |
| | | | 429/96 |
| 2014/0134469 A1 | 5/2014 | Dämon | |
| 2014/0220405 A1 | 8/2014 | Dämon | |
| 2014/0242443 A1 | 8/2014 | Hirai et al. | |
| 2022/0023833 A1* | 1/2022 | Schneider | H01M 10/613 |

FOREIGN PATENT DOCUMENTS

| | | |
|---|---|---|
| DE | 202005014588 U1 | 1/2006 |
| DE | 102013002561 A1 | 8/2014 |
| DE | 102017105444 A1 | 9/2017 |
| EP | 2731164 A1 | 5/2014 |
| EP | 2770554 A1 | 8/2014 |
| JP | 2012048905 A | 3/2012 |
| KR | 20090052505 A | 5/2009 |
| KR | 20140067083 A | 6/2014 |

* cited by examiner

USE OF AN ABSORBER MATERIAL FOR ABSORBING AND / OR DISTRIBUTING LIQUIDS IN AN ACTIVELY AND / OR PASSIVELY COOLED CURRENT-CARRYING SYSTEM

CROSS-REFERENCE TO PRIOR APPLICATION

Priority is claimed to German Patent Application No. DE 10 2020 119 727.6, filed on Jul. 27, 2020, the entire disclosure of which is hereby incorporated by reference herein.

FIELD

The invention relates to the use of an absorber material for absorbing and/or distributing liquids in an actively and/or passively cooled current-carrying system, in particular in an actively and/or passively cooled power storage system, and to the current-carrying system itself.

BACKGROUND

Current-carrying systems, in particular battery systems, are becoming increasingly important since they are required for driving electric and hybrid vehicles. In order to ensure optimum functioning of the system, it is necessary to maintain the temperature of the battery cells within a desired temperature range. In order to prevent exceeding and/or undershooting the operating temperature, active or passive temperature control systems are used. The use of liquid temperature-control agent having a high heat capacity, which conducts heat well to the battery cells in a heat exchanger, has proven particularly effective.

In addition, the systems are generally not hermetically sealed with respect to the environment. That is, they allow gas exchange with the environment. In order to prevent contamination, the incoming air is filtered. For this purpose, for example microporous films or nonwovens are used.

All these approaches permit filtering of particles, but not of gases nor, in particular, of water vapor. Water vapor can thus pass through the films into the electronic housing. However, since the interior of the housing is cooled, water can condense at cold points in the housing (if its dew point is exceeded). Since current-carrying parts are cooled in particular, condensate forms where it is most critical.

Moreover, if the temperature in the housing itself is always at a low level, the condensate formed can only be removed from the housing again with difficulty. Here, for example, pumps, controlled valves or baking out would be conceivable. These approaches are complex and possibly error-prone. In addition, baking out is prohibited in many applications (for example battery systems).

Drying agents which are attached in or in front of the housing and which irreversibly bind water represent a tried-and-tested means for absorbing water. A disadvantage here, however, is that such agents absorb not only liquid water, but also water vapor. If the means are placed in a housing, they also dehumidify the gas space in the housing. As a result, water vapor, which under normal circumstances would not have reached the housing at all, is thus also drawn into the housing. Thus, such desiccant cartridges function not only as moisture absorbers but also as moisture siphons.

A further problem is that, for example in the event of an accident of a vehicle equipped in this way, leakages can occur and the temperature-control agent can escape from the heat sink. The temperature-control agent can then come into direct contact with the battery cells and, by virtue of its conductivity, trigger a short circuit, for example.

A common desiccant is $P_2O_5$. Although it has an extremely high absorption capacity with respect to water, it forms liquid phosphoric acid upon absorption of water. This can lead to corrosion and, because of its electrical conductivity, represents a risk for electrical applications. In addition, the water absorption is irreversible. Other typical desiccants such as $CaCl_2$ react similarly. If the desiccants are loose, this leads to dust formation. In addition, they are electrically conductive in a moist state and can thus lead to short circuits.

Further known liquid-absorbing and in particular water-absorbing substances are, for example, superabsorbers. Superabsorbers are advantageous because, on the one hand, they have a very high water absorption capacity, react chemically neutrally (also with respect to organic solvents) and can also be reversibly loaded.

Superabsorbers lead to a strong swelling with polar liquid media and possibly to gel formation. The swelling in particular can lead to transport channels for the liquid being blocked by the swelling process (so-called gel blocking effect) and subsequent absorption no longer being possible. Moreover, swelling in electronic devices is disadvantageous or harmful from two further points of view: On the one hand, the swollen material can build up mechanical pressures, through which, for example, electrical contacts can be separated. On the other hand, when swelling is uncontrolled, the swollen material can cause electrical short circuits if it comes into contact with current-carrying parts.

One difficulty is the application of the superabsorber. One possibility consists in the use of superabsorbent fibers as described, for example, in EP2731164 (A1). That document shows a battery system comprising battery cells, at least one absorption element and a temperature-control system with a liquid temperature-control agent for cooling and/or heating the battery cells in a battery housing. The absorption element for absorbing the liquid temperature-control agent is arranged between the battery cells and the battery housing, the absorption element being a nonwoven, the nonwoven having an average basis weight of 250 to 700 g/m² and comprising fibers of at least two different fiber types, wherein at least one of the fiber types is a support fiber and at least one other of the fiber types is an absorbent fiber.

A disadvantage of the use of absorbent fibers is that they generally have a lower absorbency than comparable absorbent particles. In addition, they generally have a lower thermal stability in the dry state and in the swollen state. Moreover, the use of absorbent fibers, as discussed above, can result in a gel blocking effect.

In accordance with DE 4134370 C1, superabsorbent particles which are fixed on a textile fabric can be used. A disadvantage is that the resultant finished absorber pads are relatively complex to construct. For example, the pulverulent superabsorbent particles must first be fixed on a nonwoven and then the resulting product must be provided with a covering and support layer in order to prevent dust formation. Typical production-related problems are associated with the coating, for example:

Quantity limitation of the coating or of the component active here (too much powder-→material too thick-→too rigid)

Adhesion problems

Limitation with regard to the use of different synergistic swelling components such as SAP+pulp+guar, Complexity too great for the manufacturing process.

High production costs

Influence of additives (coating aids) necessary for production on the absorption behavior.

SUMMARY

In an embodiment, the present invention provides a method, comprising: providing an absorber material, comprising: a casing; and superabsorbent particles arranged therein, and using the absorber material to absorb and/or distribute liquids in an actively and/or passively cooled current-carrying system comprising an actively and/or passively cooled power storage system, wherein the casing comprises at least two plies arranged in a planar fashion on one another, wherein regions of the at least two plies are connected to one another by at least one seam such that the casing is segmented in a form of pockets separated from one another, and wherein at least some of the pockets have the superabsorbent particles.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
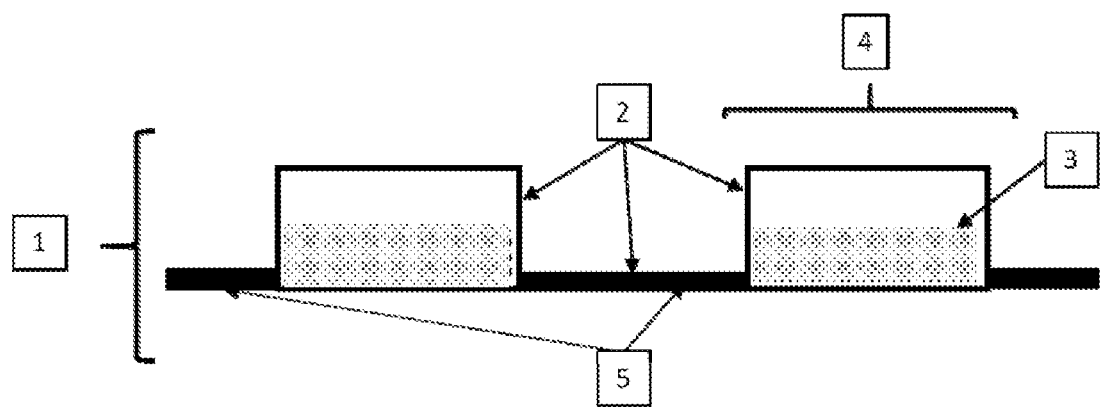
FIG. 1: Schematic cross-sectional view of an absorber material 1 according to the invention

In an embodiment, the present invention at least partially eliminates the aforementioned disadvantages. In particular, a material is to be provided which has good water absorption and retention. The material should also be capable of reversibly binding water and optionally water vapor. Moreover, it should have controlled swellability and it should be possible to avoid a blocking effect. Finally, it should be able to be used in a low-dust manner.

In an embodiment, the present invention provides use of an absorber material comprising a casing and superabsorbent particles arranged therein for absorbing and/or distributing liquids in an actively and/or passively cooled current-carrying system, in particular in an actively and/or passively cooled power storage system, wherein the casing is formed of at least two plies arranged in a planar fashion on one another, wherein regions of the plies are connected to one another by at least one seam such that the casing is segmented in the form of pockets separated from one another, and wherein at least some of the pockets have the superabsorbent particles.

According to the invention, it has been found that the absorber material according to the invention is outstandingly suitable for absorbing and distributing liquids in actively and/or passively cooled current-carrying systems, since arranging the superabsorbent particles in a segmented casing prevents or at least reduces a gel blocking effect in use. This can be attributed to the fact that forming segments divides up the amount of superabsorber, which can reduce the maximum possible accumulation of superabsorbent particles in one location and thus reduce the resulting "clumps" in the event of possible gel blocking. Moreover, the at least one seam between the pockets, similarly to a transport channel, allows a further transport of the liquid into the interior of the absorber material during the liquid absorption. As a result, the absorption capacity of the superabsorbent particles can be optimally utilized, which can likewise counteract gel blocking. In addition, the segmentation of the superabsorbent particles can reduce the risk of dust formation, since if the casing is damaged, only the portion of particles contained in the damaged segment is released. Finally, the segmentation makes it possible to use superabsorbers in particle form. Compared to superabsorbent fibers, these have the advantage of having a higher absorption capacity with comparable thermal stability both in the dry and in the swollen state.

In a preferred embodiment, the at least one seam is embodied as a welded seam, in particular as a thermally and/or ultrasonically welded seam, glued seam and/or stitched seam. An advantage of welded seams is that they can be produced particularly quickly and easily.

According to the invention, the casing is segmented by the formation of pockets separated from one another by at least one seam. By means of the at least one seam, moreover, the plies arranged in a planar fashion on one another can be connected to one another. The regions of the casing which do not have a seam are preferably not compressed, and/or at least less compressed than the seam regions.

According to the invention, the term "current-carrying system" is used in the conventional sense as a system through which electric current flows. Current-carrying systems preferred according to the invention are current-carrying systems selected from a power storage system, a current-carrying energy converter, a transformer, a power electronics system, a control electronics system, in particular a processor-controlled system, a charging station, an inverter, a rectifier, an electrolyzer and/or combinations thereof.

According to the invention, the term "power storage system" is used in the usual sense. In particular, a power storage system is understood to be a system for storing energy, which is currently available but not required, for later use. This storage is frequently accompanied by a conversion of the energy form, for example from electrical to chemical energy. When needed, the energy is then converted back into the desired electrical form. According to the invention, preferred power storage systems are battery systems, capacitors and/or rechargeable batteries. Battery systems are most particularly preferred.

Battery systems are modules connected in series or in parallel, which contain secondary or primary cells connected in series or in parallel. Rechargeable batteries are modules connected in series or in parallel, which contain secondary cells connected in series or in parallel.

Capacitors are passive electrical components with the ability to statically store electrical charge and the associated energy in an electric field in a DC circuit.

The absorption of liquids is to be understood as meaning that the absorber material absorbs liquids. As a result, the current-carrying system can be protected from damage by the liquids.

The distribution of liquids is to be understood as meaning that the absorber material distributes liquids over its surface. Absorption and distribution preferably take place in parallel.

The liquids to be absorbed by the system according to the invention are preferably cooling liquids and/or water, since these are usually used or formed in actively or passively cooled current-carrying systems. Preferred cooling liquids are alcohols, in particular glycol and/or alcohol/water mixtures, in particular glycol/water mixtures.

In one embodiment of the invention, the liquid to be absorbed by the system according to the invention is not a battery electrolyte.

The at least one seam may be continuous or discontinuous. Discontinuous seams are composed of direct seam areas, i.e. those regions of the seam which serve to bond the two plies, and indirect seam areas, i.e. those regions of the seam which lie between the direct seam areas and do not belong to the pockets. In welded seams, the direct seam areas are the welded regions, in sewn seams they are the regions covered by the thread, in glued seams, they are the regions connected by adhesive. Discontinuous seams have the advantage that they have a lower proportion of seam area and thus have higher capillarity and better passage of the liquid to be absorbed.

Continuous seams have the advantage that the risk of the superabsorbent particles escaping is reduced. Further, the at least one seam may be designed as a straight or curved line or combinations thereof. In a discontinuous configuration, the at least one seam may be designed in the form of dots and/or dashes arranged linearly and/or regularly. As explained above, those portions of the seam that serve to bond the two plies are the direct seam areas of the seam. The width of the at least one seam is preferably 0.5 to 15 mm, more preferably 0.5 to 10 mm and particularly preferably 1 to 6 mm. Further preferably, the seam area, i.e. the sum of the indirect and direct seam area on the surface of the absorber material, is at least 0.4 to 50 area %, more preferably 2 to 40 area % and particularly preferably 4 to 35 area %. If the seam area is less than 0.4 area %, the strength of the seam is generally too low. If the seam area is above 50%, the area available for swelling is too low.

In a particular embodiment, the at least one seam is designed as a welded seam which is perforated, preferably in its center. It is advantageous here that the absorber material can be adapted to the installation situation in a particularly simple manner. For example, recesses can be formed in a targeted manner by detaching partial regions along the perforated welded seam.

The shape of the welded seam may vary. In a preferred embodiment, the transition between the welded seam and the unwelded regions of the plies is smooth. Thus, in a preferred embodiment, the thickness of the welded regions of the welded seam increases in the direction of at least one pocket adjacent to the welded seam, preferably in the direction of both pockets adjacent thereto. Accordingly, the density of the welded regions of the welded seam decreases in the direction of at least one pocket, preferably in the direction of both pockets adjacent thereto. The transition between welded seam and pocket is preferably continuous. The region of highest compression is preferably located in the center of the welded seam. This can result in a rounded, in particular semicircular, geometry of the welded seam. This affords the advantage of a higher strength of the welded seam.

The pocket geometry may vary. The pockets preferably have, independently of one another, one or more of the following geometries: rectangular, triangular, hexagonal, scalloped, round, oval and/or curved. Particularly preferably, the pockets are at least partially present with a rectangular pocket geometry. This geometry is preferred because it can be technically reproduced in a particularly simple manner.

In a further preferred embodiment, the number of pockets per square meter of absorber material is in the range of at least two pockets per square meter, for example 4 to 400 pockets per square meter, more preferably 8 to 300 pockets per square meter and in particular 16 to 200 pockets per square meter.

Further preferably, the amount of superabsorbent particles is at least 20 g/m$^2$, for example 20 to 1000 g/m$^2$, preferably 20 to 800 g/m$^2$ and particularly preferably 20 to 600 g/m$^2$, based on the area of the absorber material.

Furthermore, the amount of superabsorbent particles per pocket is preferably at least 0.5 g per pocket, for example 0.5 g to 500 g per pocket, preferably 20 to 400 g per pocket and in particular 20 to 200 g per pocket.

Superabsorbers are wherein they can bind and absorb water exceptionally well, i.e. they have good retention. According to the invention, a superabsorber is understood to mean a polymer which is capable of soaking up or absorbing a multiple—up to 500 times—of its own weight in liquids, preferably water, wherein it increases in volume.

Superabsorbers form hydrogels in the swollen state. Suitable superabsorbent particles have in particular crosslinked polymers which are polar, and in particular consist thereof. Particular preference is given to polyacrylamide, polyvinylpyrrolidone, amylopectin, gelatin and/or cellulose. Very particular preference is given to copolymers of acrylic acid (propenoic acid, $H_2C=CH-COOH$) and/or sodium acrylate (sodium salt of acrylic acid, $H_2C=CH-COONa$) on the one hand and acrylamide on the other. The ratio of the two monomers to one another can vary.

As a rule, what is referred to as a core cross-linker (CXL) is added to the aforementioned monomers, which connects (crosslinks) the long-chain polymer molecules formed to one another at certain points using chemical bridges. These bridges make the polymer water-insoluble. In addition, what is referred to as a surface cross-linker (SXL) can be used. In this case, a further chemical is applied to the surface of the particles, which, by heating, forms a second network only on the outer layer of the particle. This layer supports the swollen gel in order to hold it together even with external loading (movement, pressure).

In a preferred embodiment, at least one pocket comprises, in addition to the superabsorbent particles, a filler material, for example absorbent materials such as cellulose pulp, fibers, guar, silica gel and/or foam. The filler material is preferably present in a proportion by weight (filler material to total amount of filler material plus superabsorbent particles) of at least 5 wt %, for example from 5 to 90 wt %, more preferably from 5 to 75 wt % and in particular from 5 to 50 wt %.

In a further preferred embodiment, at least one pocket comprises, in addition to the superabsorbent particles, fire-retardant substances, for example substances which release fire-retardant and/or combustion gas-diluting gases.

In a further preferred embodiment, the absorber material has a degree of sound absorption a, measured in accordance with DIN EN ISO 10534-1:2001 in the impedance tube, of at least 0.1 at 1000 Hz, for example from 0.1 to 1, preferably from 0.2 to 1, more preferably from 0.3 to 1.

The degree of sound absorption can be adjusted in various ways known to those skilled in the art. A high degree of absorption can be achieved by at least one additional ply, which is preferably arranged on the plies arranged in a planar fashion on one another. The additional ply preferably has a meltblown nonwoven.

Thus, in a preferred embodiment, the absorber material according to the invention has at least one additional ply, which is preferably a meltblown nonwoven. Further preferably, the additional ply is arranged on at least one outer side of the casing. It is likewise conceivable for the additional ply to be arranged within the pockets. In a further preferred embodiment, at least one pocket has acoustically active fillers, such as in particular fiber pulp.

In a further preferred embodiment, at least one ply of the casing has a textile fabric, for example a nonwoven, a woven, a knitted fabric and/or an open-pored foam. These materials are advantageous because of their good water permeability paired with a high structural integrity, even in the wet state. Preferred nonwovens are spunbond nonwovens, wetlaid nonwovens and/or drylaid nonwovens. The basis weight is preferably 10 g/m$^2$ to 500 g/m$^2$.

In a further preferred embodiment, the surface energy of the textile fabric, measured in accordance with DIN 55660-2:2011-12, is greater than 30 mN/m, preferably greater than 35 mN/m and particularly preferably greater than 40 mN/m. It is advantageous here that polar media such as water or water/glycol mixtures can be distributed particularly well.

In a further preferred embodiment, the air permeability of the textile fabric is more than 10 dm$^3$/(m$^2$s), more preferably 20 to 3000 dm$^3$/(m$^2$s), more preferably 30 to 2000 dm$^3$/(m$^2$s), in particular 30 to 1000 dm$^3$/(m$^2$s). The air permeability is measured in accordance with DIN EN ISO 9237:1995 at a differential pressure of 200 Pa. The measurements of air permeability take place before liquid makes contact with samples of the textile fabric with a thickness of 0.05 to 10 mm, preferably 0.1 to 1 mm, particularly with a sample surface area of 20 cm$^2$, which sample has air flowing through it, at an air pressure differential of 200 Pa.

In a further preferred embodiment, the air permeability of the absorber material is more than 10 dm$^3$/(m$^2$s), preferably in the range from 20 to 3000 dm$^3$/(m$^2$s), more preferably from 30 to 2000 dm$^3$/(m$^2$s), particularly preferably in the range from 30 to 1000 dm$^3$/(m$^2$s). The air permeability is measured in accordance with DIN EN ISO 9237:1995 at a differential pressure of 200 Pa. The measurements of air permeability take place before liquid makes contact with samples of the textile fabric with a thickness of 0.1 to 15 mm, preferably 0.25 to 5 mm, particularly with a sample surface area of 20 cm$^2$, which sample has air flowing through it, at an air pressure differential of 200 Pa.

In a preferred embodiment of the invention, the textile fabric has an average pore size, measured in accordance with ASTM E 1294-89, of more than 1 μm, for example from 1 μm to 1000 μm, in particular from 10 to 800 μm.

In a further preferred embodiment of the invention, the textile fabric has microfibers, preferably with a titer of less than 1 dtex, for example from 0.01 to 1 dtex, more preferably from 0.01 to 0.9 dtex. It is advantageous here that the microfibers enable a particularly high capillarity and thereby a particularly good distribution of liquids. Moreover, because of their fineness, microfibers enable a particularly small pore size and thus a particularly low permeability for dust released by the superabsorbent particles.

In a further preferred embodiment of the invention, the absorber material has a liquid absorption capacity (demineralized water) of at least 2 l/m$^2$, for example from 2 l/m$^2$ to 300 l/m$^2$, more preferably from 3 l/m$^2$ to 300 l/m$^2$, more preferably from 5 l/m$^2$ to 300 l/m$^2$, more preferably from 10 l/m$^2$ to 300 l/m$^2$ and in particular from 20 l/m$^2$ to 300 l/m$^2$.

The textile fabric preferably contains thermoplastic polymers, in particular having a melting point below 270° C. Particularly preferred polymers are polyesters, copolyesters, polyamides, copolyamides, polyolefins and/or blends thereof. It is advantageous here that these can be used for thermal welding. However, the use of non-thermoplastic polymers is also conceivable. Such textile fabrics can be adhesively bonded to one another if required.

In a further preferred embodiment, the absorber material is compressible. As a result, it can be fixed well in actively and/or passively cooled current-carrying systems, in particular in actively and/or passively cooled power storage systems. Moreover, good contact with adjacent components can be ensured thereby. The compressive hardness of the absorber material, measured in accordance with DIN EN ISO 3386-1:2015-10, is preferably at least 0.05 kPa, for example 0.05 to 50 kPa, preferably 0.05 to 25 kPa, and particularly preferably 0.1 to 10 kPa, at 40% compression.

In a further preferred embodiment, the casing has at least two different textile fabrics arranged in a planar fashion on one another. In this case, the textile fabrics preferably differ in terms of the polymer materials from which they are constructed. Alternatively or additionally, the textile fabrics may differ in terms of the manner in which they are produced, thickness, maximum tensile strength, maximum tensile elongation, modulus, weight, air permeability and/or porosity. It is therefore conceivable for the casing to have two or more different textile fabrics which differ, for example, in terms of one or more of the aforementioned properties. In order to form the pockets, as explained above, the various textile fabrics can be connected to one another in various ways, for example thermally welded to one another and/or glued to one another and/or sewn to one another.

In a further preferred embodiment, the absorber material has a self-adhesive ply on at least one side of the casing. Self-adhesive should be understood here to mean that the self-adhesive ply makes it possible to fix the absorber material on different solid surfaces. The self-adhesive ply can cover the casing over its entire surface or only partially. The self-adhesive ply can be a double-sided adhesive tape, for example.

The use of superabsorbent particles is advantageous in that they generally burn poorly and thereby increase the flame resistance of the absorber material. If an even further increased flame resistance is desired, the absorber material can be equipped with flame-retardant additives and/or non-combustible fibers, such as for example glass fibers or aramid fibers. As a result, the absorber material can achieve flame resistance in accordance with UL 94 HB.

In a further embodiment, the absorber material is present as an absorber pad. An absorber pad is understood to mean an absorber material which has been cut up and welded at the edges. Another subject matter of the present invention comprises an absorber pad containing an absorber material according to one or more of the described embodiments. The absorber pad can have a wide variety of symmetrical and/or asymmetrical geometric shapes.

Typically, the absorber pad has two different types of seams, namely the peripheral seams and the internal seams.

An internal seam should be understood to mean a seam which delimits at least one pocket on each side. Preferably at least two, more preferably at least 80%, of the internal seams intersect.

In a further preferred embodiment, the external seams are continuous and the internal seams are discontinuous. This makes it possible to combine the advantageous properties of both types of seam.

A further subject matter of the invention is an actively and/or passively cooled current-carrying system, in particular a power storage system, comprising an absorber material, comprising a casing and superabsorbent particles arranged therein for absorbing and distributing liquids in a current-carrying system, wherein the casing is formed of at least two plies arranged in a planar fashion on one another, wherein regions of the plies are connected to one another such that the casing is segmented in the form of pockets separated from one another by seams, and wherein at least some of the pockets have the superabsorbent particles.

Preferred current-carrying systems are current-carrying systems selected from a power storage system, a current-carrying energy converter, a transformer, a power electronics system, a control electronics system, in particular a processor-controlled system, a charging station, an inverter, a rectifier, an electrolyzer and/or combinations thereof.

In a preferred embodiment, the current-carrying system is a battery system that comprises a battery housing. The battery housing preferably contains battery cells. The battery cells are preferably thermally conductively connected to a cooling system. A pressure equalizing element is preferably provided in the wall of the battery housing for equalizing the pressure between the interior and the exterior of the battery housing. The absorber pad is preferably arranged underneath the cooling system. As a result, the escaping cooling liquid or the deposited condensate can be particularly efficiently absorbed. The absorber pad is therefore preferably arranged in the bottom region of the current-carrying system, i.e. between the cooling system and the bottom of the battery housing. Additionally or alternatively, the absorber pad can be arranged in the side region of the current-carrying system, i.e. between the cooling system and the side walls of the battery housing.

FIG. 1 shows a cross section of an absorber material 1 according to the invention, comprising a casing 2 and superabsorbent particles 3 arranged therein. The casing 2 comprises two plies arranged in a planar fashion on one another in the form of textile fabrics, wherein regions of the plies are connected to one another such that the casing is segmented in the form of pockets 4 separated from one another by welded seams 5. At least some of the pockets have the superabsorbent particles 3.

Figure 2:
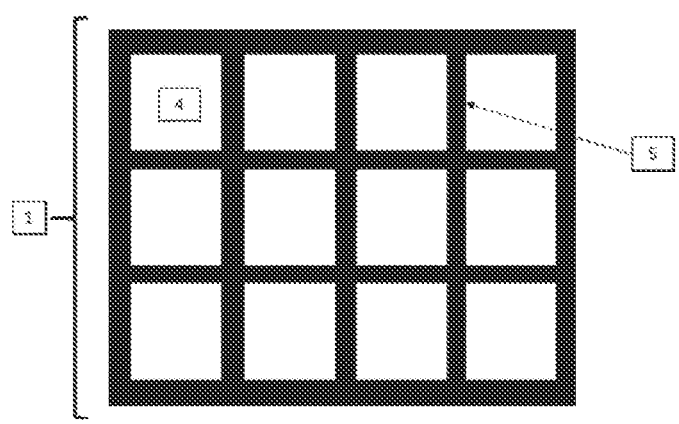
FIG. 2: Schematic plan view of an absorber material according to the invention

FIG. 2 shows a plan view of an absorber material 1 according to the invention, divided up into twelve pockets 4 and welded seams 5.

Figure 3:
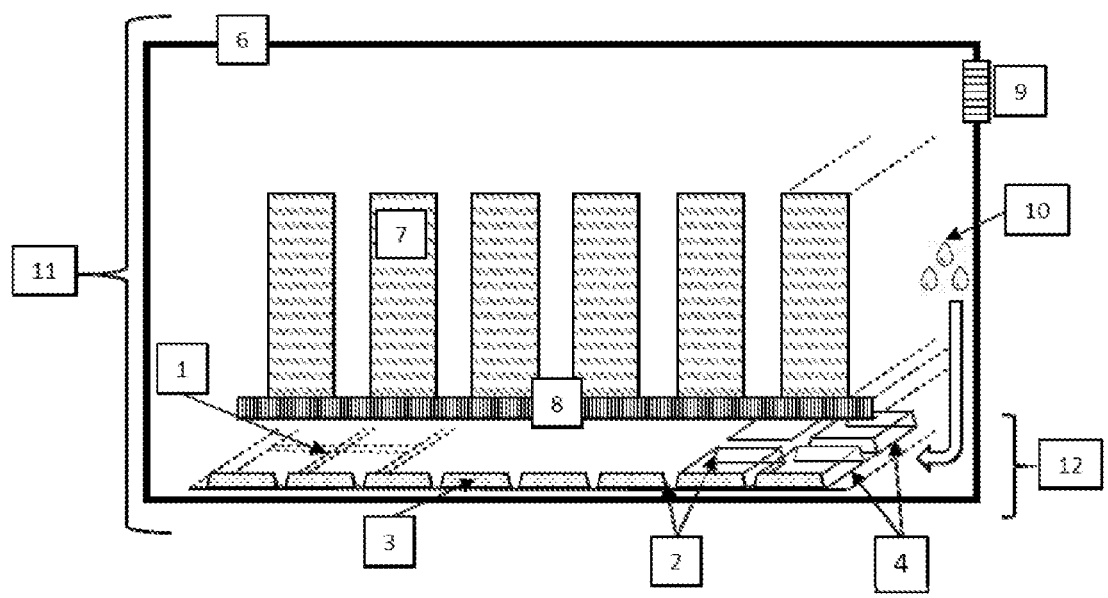
FIG. 3: Schematic view of a power storage system 11 according to the invention

FIG. 3 shows a power storage system 11 according to the invention, in the form of a battery comprising a battery housing 6. The battery housing 6 contains battery cells 7. The battery cells 7 are thermally conductively connected to a cooling system 8. A pressure equalizing element 9 is provided in the wall of the housing for equalizing the pressure between the interior and the exterior of the battery housing 6. The absorber material 1 is arranged underneath the cooling system 8, since this makes it possible to absorb escaping cooling liquid 10 or deposited condensate 10. The absorber material 1 is arranged in the bottom region 12 of the power storage system 11, i.e. between the cooling system 8 and the bottom of the battery housing 6. The absorber material 1 comprises a casing 2 and superabsorbent particles 3 arranged therein. The casing 2 further comprises a textile fabric and is divided up into pockets 4. The absorber material 1 is shown here in the unswollen state.

Figure 4:
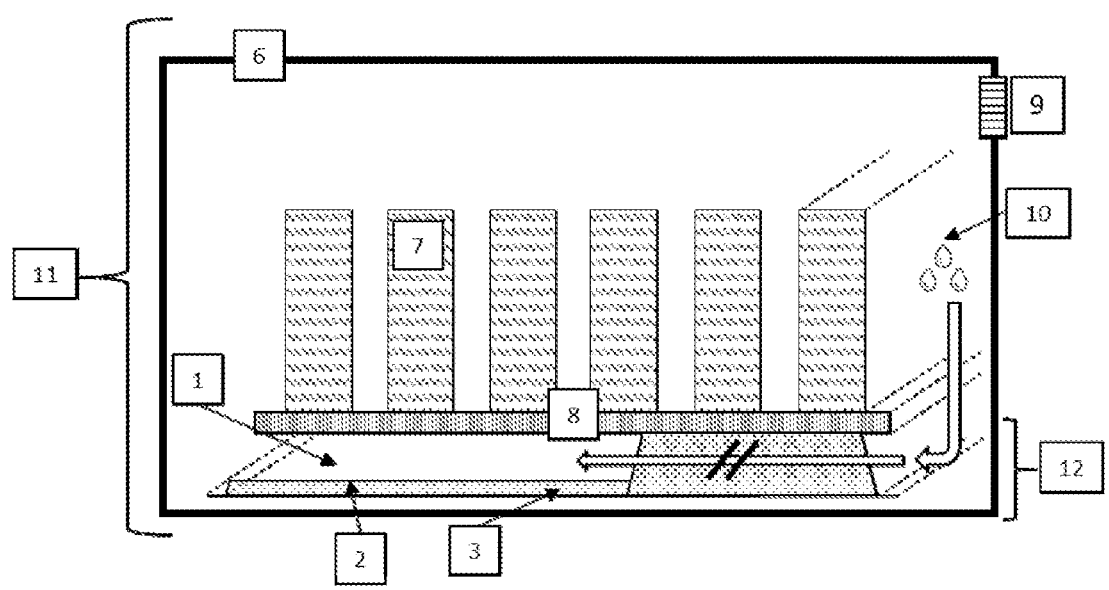
FIG. 4: Schematic view of a power storage system 11 not according to the invention

FIG. 4 shows a power storage system 11 not according to the invention, comprising a battery housing 6. The battery housing 6 contains battery cells 7. The battery cells 7 are thermally conductively connected to a cooling system 8. A pressure equalizing element 9 is provided in the wall of the housing for equalizing the pressure between the interior and the exterior of the battery housing 6. The absorber material 1 is arranged underneath the cooling system 8, since this makes it possible to absorb the escaping cooling liquid 10 or the deposited condensate 10. The absorber material 1 is arranged in the bottom region 12 of the power-storing system 11, i.e. between the cooling system 8 and the bottom of the battery housing 6. The absorber material 1 comprises a casing 2 and superabsorbent particles 3 arranged therein. The casing 2 further comprises a textile fabric and is not divided up into pockets. Furthermore, the manner in which escaping cooling liquid 10 or deposited condensate 10 penetrates laterally into the absorber material and is prevented from further penetration by the swelling of the absorber material is shown.

Figure 5:
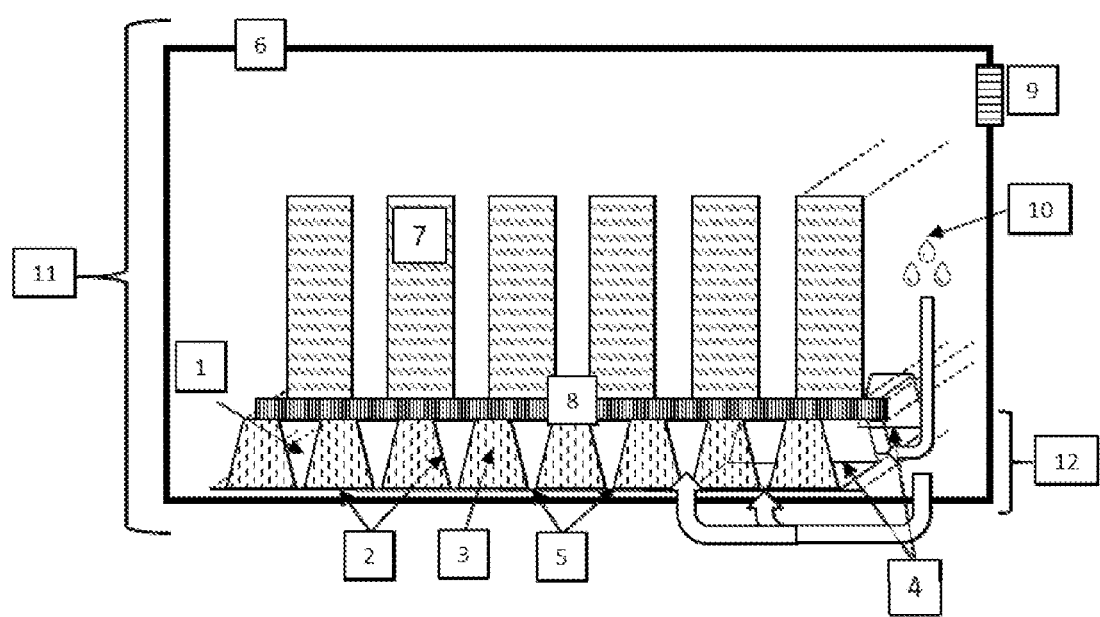
FIG. 5: Schematic view of a power storage system 11 according to the invention

FIG. 5 shows a power storage system 11 according to the invention, comprising a battery housing 6. The battery housing 6 contains battery cells 7. The battery cells 7 are thermally conductively connected to a cooling system 8. A pressure equalizing element 9 is provided in the wall of the housing for equalizing the pressure between the interior and the exterior of the battery housing 6. The absorber material 1 is arranged underneath the cooling system 8, since this makes it possible to absorb escaping cooling liquid 10 or deposited condensate 10. The absorber material 1 is arranged in the bottom region 12 of the power-storing system 11, i.e. between the cooling system 8 and the bottom of the battery housing 6. The absorber material 1 comprises a casing 2 and superabsorbent particles 3 arranged therein. The casing 2 further comprises a textile fabric and is divided up into pockets 4. Furthermore, the manner in which escaping cooling liquid 10 or deposited condensate 10 penetrates unhindered into the absorber material laterally and from the front via the seams 5 between the pockets 4 is shown. The absorber material is shown here in the swollen state.

Figure 6:
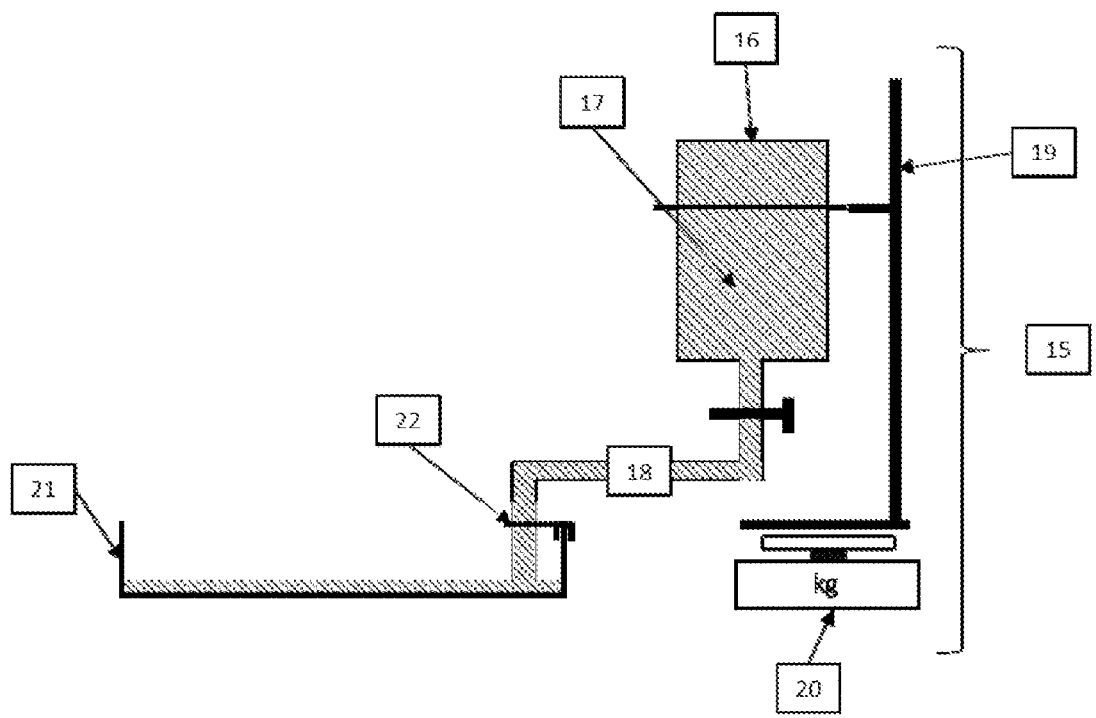
FIG. 6: Schematic view of a measuring apparatus 15 for determining the absorption kinetics

FIG. 6 shows the measuring apparatus 15 for determining the absorption kinetics. A glass bottle 16 is filled with the cooling liquid 17 and provided with a rubber hose 18 (10×2 mm, 50 cm long) in an airtight manner. Here, the rubber hose 18 is sealable by means of a clamp. The glass bottle 16 is secured upside down to a stand 19, with the stand 19 placed on scales 20 in order to log the reduction in weight during the kinetics measurement. The opening of the rubber hose 18, on the bottom at the edge, is in an instrument tray 21 (MF resin) having an inner surface of 315×210×50 mm (l×w×h) in such a way that the opening of the hose is parallel to the ground. The hose is fixed without deformation with a hose clamp 22 at the edge of the instrument tray 21. The distance to the bottom of the tray can be varied.

Figure 7:
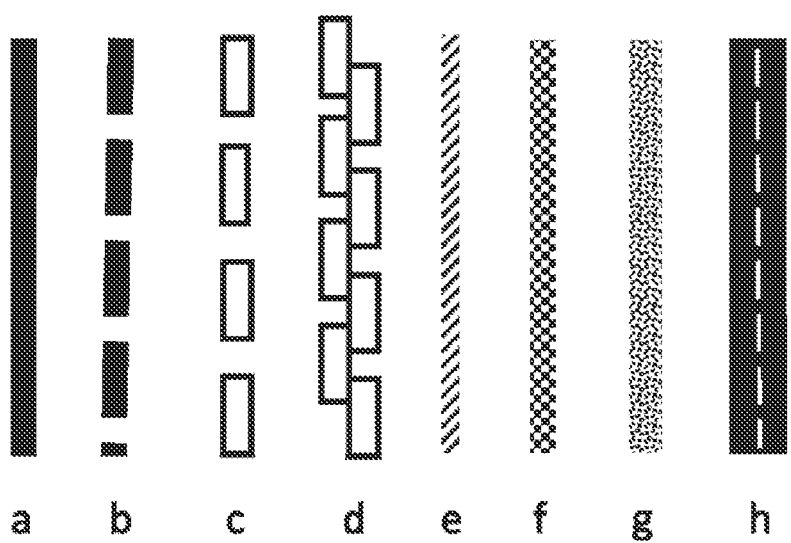
FIG. 7: Schematic view of various embodiments of the seam 5

FIG. 7 shows various embodiments of the seam 5. In this case, the black region represents the direct seam area. Seam a represents a continuous seam which consists entirely of direct seam area. The seams b to g are discontinuous in various embodiments. In the seam b, the black rectangles schematically represent the direct seam areas and the region between the black rectangles represents the indirect seam area. In the seam c and d, the borders of the rectangles schematically represent the direct seam areas and the region between and inside the rectangles represents the indirect seam area. In the seam e, f, g and h, the black regions schematically represent the direct seam areas and the regions therebetween represent the indirect seam area. The seam h is formed as a centrally perforated welded seam.

Figure 8:
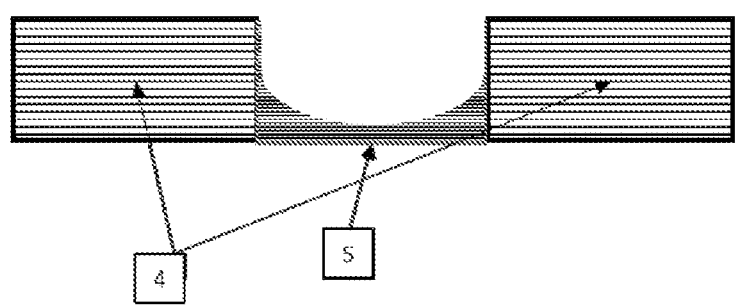
FIG. 8: Schematic view of the cross section of a seam 5 between two pockets 4

FIG. 8 shows the cross section of a seam 5 between two pockets 4. The seam 5 is in the form of a welded seam. The pockets 4 are to the left and right of the welded seam. The thickness of the welded seam increases in the direction of the pockets. Correspondingly, the density of the welded seam decreases in the direction of the pockets. This transition is continuous. The region of highest compression is located in the center of the welded seam 5.

Figure 9:
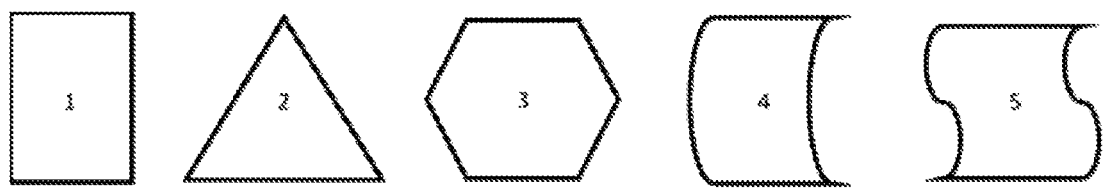
FIG. 9: Schematic view of various pocket geometries

FIG. 9 shows various pocket geometries (rectangular, triangular, hexagonal, scalloped, curved).

Figure 10:
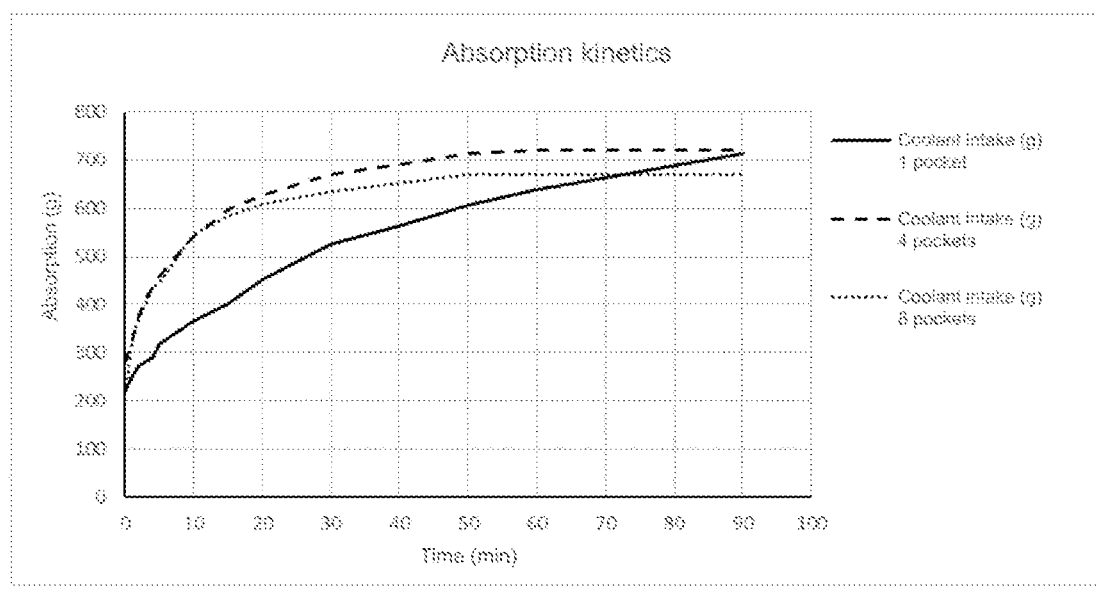
FIG. 10: Measurement results for the absorption kinetics of various absorption pads according to the invention

FIG. 10 shows the absorption kinetics of various absorption pads with a different number of chambers. It is clear that the absorption pads according to the invention with four or eight chambers have a higher rate of absorption than a system with just one chamber. This is advantageous because the escaping cooling liquid can be absorbed more quickly.

The invention is explained in more detail below with reference to several examples:

Example 1: Production of Different Absorber Materials

In a continuous production process, 2 casing substances are connected to one another by means of ultrasonic welding methods, with ultrasound in both the longitudinal and transverse directions. The sonotrode is operated at 30 kHz and the casing substances are welded at a speed of 10 m/min. The geometry of the welded seam is continuous and corresponds to structure a in FIG. 7, the width being 3 mm. The pockets formed in this way are filled with the corresponding amount of superabsorbent particles (see table) before the final closure. The filling is effected via an automated metering device which is integrated into the continuous production plant. The seams for the optimized distribution of the liquid to be absorbed are produced directly in terms of shape and size in the production process with the welding tools used. The final size of the absorber pads is produced by cutting directly in the plant or as a concatenated process step directly thereafter.

The following absorber pads were produced:

TABLE 1

|  | Absorber pad I not according to the invention | Absorber pad II according to the invention | Absorber pad III according to the invention |
| --- | --- | --- | --- |
| Textile fabric (two plies) | 40 g/m² PET/co-PES nonwoven, calendered | 40 g/m² PET/co-PES nonwoven, calendered | 40 g/m² PET/co-PES nonwoven, calendered |
| Absorber pad size (mm) | 200 × 290 | 200 × 290 | 200 × 290 |
| Number of pockets | 1 | 4 | 8 |
| Type of welded seam (FIG. 7) | a | A | a |
| Total superabsother (g) | 12.5 | 12.5 | 12.5 |
| Width of welded seam (mm) | 3 | 3 | 3 |
| Superabsorber (g/pocket) | 12.5 | 3.125 | 1.56 |
| Type of superabsorber | Partially neutralized polyaclylic acid | Partially neutralized polyaclylic acid | Partially neutralized polyaciylic acid |
| Absorption capacity (g) 1 min | 251 | 326 | 320 |
| 5 min | 319 | 459 | 446 |
| 15 min | 402 | 598 | 585 |
| 30 min | 524 | 670 | 635 |
| 60 min | 639 | 721 | 670 |

It is clear that the absorption pads according to the invention with four or eight pockets have a higher rate of absorption than a system with one pocket, for the same amount of superabsorber. Moreover, it was found that the absorption pads according to the invention exhibit good retention for the cooling liquid and swell in a controlled manner.

Absorption Kinetics Measurement:

The measuring apparatus is constructed as shown in FIG. 6 and 200 g of the cooling liquid 17 are initially charged in the instrument tray. The distance of the hose end from the bottom of the instrument tray is set to 3 mm in such a way that cooling liquid flows out of the bottle as the liquid level drops. If the system is in equilibrium, i.e. no further cooling liquid flows out of the bottle, the manufactured absorber pad is placed in the instrument tray in such a way that the superabsorber particles are located in a corner region of the pad. The time is stopped and the reduction in weight is logged using the scales. The values of the kinetics are shown in table 1 and FIG. 10.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method, comprising:
   providing an absorber material, comprising:
      a casing; and
      superabsorbent particles arranged therein, and
   using the absorber material to absorb and/or distribute liquids in an actively and/or passively cooled current-carrying system comprising an actively and/or passively cooled power storage system,
   wherein the casing comprises at least two plies arranged in a planar fashion on one another,
   wherein regions of the at least two plies are connected to one another by at least one seam such that the casing is segmented in a form of pockets separated from one another,
   wherein the at least one seam is configured to transport liquid between the pockets, and
   wherein at least some of the pockets have the superabsorbent particles.

2. The method according to claim 1, wherein the seam comprises a welded seam comprising a thermally and/or ultrasonically welded seam, glued seam, and/or stitched seam.

3. The method according to claim 1, wherein the current-carrying system comprises:
   a power storage system comprising a battery system,
   a current-carrying energy converter,
   a transformer,
   a power electronics system,
   a control electronics system comprising a processor-controlled system,
   a charging station,
   an inverter,
   a rectifier,
   an electrolyzer, and/or
   combinations thereof.

4. The method according to claim 1, wherein the liquids to be received by the absorber material comprise cooling liquids and/or water.

5. The method according to claim 1, wherein the seam is discontinuous.

6. The method according to claim 1, wherein a seam area is at least 0.4 to 50 area % based on a total area of the absorber material.

7. The method according to claim 1, wherein the seam comprises a welded seam which is perforated in a center thereof.

8. The method according to claim 1, wherein the seam comprises a welded seam, and a thickness of the welded seam increases in a direction of at least one pocket adjacent to the welded seam.

9. The method according to claim 1, wherein a number of pockets per $m^2$ of absorber material is in a range from 4 to 400 pockets per square meter.

10. The method according to claim 1, wherein an amount of superabsorbent particles is from 20 to 1000 g/m2, based on an area of the absorber material.

11. The method according to claim 1, wherein an amount of superabsorbent particles is 0.5 g to 500 g per pocket.

12. The method according to claim 1, wherein at least one pocket, in addition to the superabsorbent particles, comprises a filler material comprising absorbent materials comprising cellulose pulp, fibers, guar, silica gel and/or foam, in an amount of from 5 to 90 wt %.

13. The method according to claim 1, wherein the at least one ply of the casing has a textile fabric comprising a nonwoven, a woven, a knitted fabric, and/or an open-pored foam.

14. The method according to claim 13, wherein an average pore size of the textile fabric, measured in accordance with ASTM E 1294-89, is from 1 to 1000 μm.

15. The method according to claim 1, wherein the absorber material has a liquid absorption capacity (demineralized water) of 21/m2 to 3001/m2.

16. The method according to claim 1, wherein the absorber material comprises an absorber pad.

17. The method according to claim 4, wherein the liquids to be received by the absorber material comprise cooling liquids, and
   wherein the cooling liquids comprise alcohols comprising glycol and/or alcohol/water mixtures comprising glycol/water mixtures.

18. The method according to claim 6, wherein the seam area is at least 2 to 40 area % based on the total area of the absorber material.

19. The method according to claim 18, wherein the seam area is at least 4 to 35 area % based on the total area of the absorber material.

20. An actively and/or passively cooled current-carrying system, in particular a power storage system, comprising:
   an absorber material, the absorber material comprising a casing and superabsorbent particles arranged therein configured to absorb and distribute liquids in the current-carrying system,
   wherein the casing comprises at least two plies arranged in a planar fashion on one another,
   wherein regions of the at least two plies are connected to one another such that the casing is segmented in a form of pockets separated from one another by seams,
   wherein the seams are configured to transport liquid between the pockets, and
   wherein at least some of the pockets have the superabsorbent particles.

* * * * *